(12) United States Patent
Kang

(10) Patent No.: US 6,833,434 B2
(45) Date of Patent: Dec. 21, 2004

(54) NOCTILUCENT POLYURETHANE CHIPS AND METHODS OF MANUFACTURING THE SAME

(75) Inventor: Sung Soon Kang, Seoul (KR)

(73) Assignee: Samki Entech Co., Ltd. (KR)

( * ) Notice: Subject to any disclaimer, the term of this patent is extended or adjusted under 35 U.S.C. 154(b) by 0 days.

(21) Appl. No.: 10/719,827

(22) Filed: Nov. 21, 2003

(65) Prior Publication Data

US 2004/0220286 A1 Nov. 4, 2004

(30) Foreign Application Priority Data

May 2, 2003 (KR) .......................................... 2003-28237

(51) Int. Cl.[7] .................................................. C08F 6/00
(52) U.S. Cl. ........................ 528/480; 521/164; 521/165
(58) Field of Search ................................ 521/164, 165; 528/480

(56) References Cited

U.S. PATENT DOCUMENTS 4,304,706 A  12/1981  Urs
5,665,793 A  9/1997  Anders

FOREIGN PATENT DOCUMENTS

JP  55087120  * 6/1982
KR  2003079359  * 10/2003

* cited by examiner

Primary Examiner—Terressa Boykin
(74) Attorney, Agent, or Firm—Madson & Metcalf

(57) ABSTRACT

The present invention provides noctilucent polyurethane chips and a method of manufacturing the same, which provide pedestrians and drivers or bicycle riders with clear sights even at night or while raining, thus significantly reducing the danger of accidents. Also, the noctilucent polyurethane chips and the manufacturing method thereof according to the present invention serve to care for natural resources and prevent environmental pollution by recycling waste polyurethane, and by using phosphorescent substances as a raw material of pavement, the noctilucent polyurethane chips having aesthetic view and excellent functionality are provided.

5 Claims, 1 Drawing Sheet

NOCTILUCENT POLYURETHANE CHIPS AND METHODS OF MANUFACTURING THE SAME

FIELD OF THE INVENTION

The present invention relates to noctilucent polyurethane chips and a method of manufacturing the same, and more particularly to noctilucent polyurethane chips and their manufacturing method by using waste polyurethane and photoluminescent pigments, to care for natural resources and prevent environmental pollution and to provide pedestrians and drivers or bicycle riders with safe passage on streets and roads at night as well.

BACKGROUND OF THE INVENTION

As an industrial waste obtain able from soles for shoes, parts for refrigerators or cars, etc., waste polyurethane which is synthetic rubber of high quality has a high possibility of recycling. However, conventionally, the waste polyurethane has been incinerated or buried and barely have been recycled, due to the domestic restrictions in marketability and economical usefulness.

Meanwhile, various attempts to develop methods of recycling or disposing waste tires have been sought, among which there are method of recycling waste tires in their original form as in case of building up military camp sites, public works, reclamation or piling up; method of thermally processing waste tires as in case of cement kiln, dry distillation and heat decomposition; and method of processing waste tires to recycled activated charcoal and rubber powder.

The above method of recycling waste tires in their original form, however, had disadvantages in that tires are not easily biodegradable and thus the problem of environmental pollution can last for a long time. Also, the method of thermally processing waste tires had problem that it may generate sources of secondary pollution during the heat treatment. Therefore, in view of protecting environment, the method of processing waste tires has been preferred.

One example of the method of processing waste tires is disclosed in Korean Patent Application Nos. 2002-10319 and 2002-10320 entitled "resilient pavement using waste tires and waste urethane rubber chips and a method of construction thereof". The pavement disclosed in the above patent applications comprises a lower supporting layer and an upper resilient layer, the lower supporting layer comprising 70–80% by weight of fine aggregates (gravel) having average particle diameter of 6–10 mm and 20–30% by weight of rubber chips of pulverized waste tires having particle diameter of 4–8 mm, and the upper resilient layer mainly comprising color rubber chips of waste urethane cut in the particle diameter of 3–4 mm. Further, the method of constructing the pavement comprises hardening a construction site to be flat, constructing a primer layer, dispersing the material for the lower supporting layer, and before the material for the lower supporting layer is hardened, dispersing the material for the upper resilient layer.

However, because the pavement which used waste tire chips had limitations in that the physical properties of the pavement such as constriction and expansion coefficient or weather resistance were different from those of adhesives (binding agent), the pavement had inferior durability and its color was dark and monotonous.

In addition, the resilient rubber pavement had disadvantages that its manufacturing procedure was complicated and smelled bad in summer.

In the meantime, as the pavement for sidewalks, bicycle ways, promenades of parks, exercising roads and so on, concrete which is a mixture of stones and cement has been used. Sometimes, color concrete, porous concrete and asphalt concrete, etc. have been used. However, the concrete pavement had disadvantages in that it was too strong that the impact on peoples' knees on landing while walking or running on the pavement was too great. Also, concrete paving bricks and color concrete pavement were easily destroyed by even a slight impact thereon and they were lacking in resiliency and had poor shock absorption, although they were excellent in hardness, heat resistance and weather resistance.

In addition, conventional pavement for sidewalks, bicycle ways, promenades of parks and exercising roads, which uses concrete and waste tire rubber chips, was dark. Therefore, it caused inconvenience and danger to pedestrians or drivers or bicycle riders since they could not easily distinguish road and street, especially when it was raining or at night. As a result, pedestrians, drivers or riders were exposed to accidents more frequently.

Accordingly, the inventor of the present invention studied and researched into pavement materials and methods of manufacturing the same by using recycled waste polyurethane obtained from soles of shoes, parts of refrigerators and vehicles, etc. and decrepit (recycled) polyurethane resilient pavement, and also using phosphorescent substance. As a result, the inventor completed the present invention which provides resiliency while walking and enables pedestrians, drivers or riders to clearly distinguish streets and roads even at night or while raining, thereby significantly reducing the anger of accidents.

The phosphorescent substance is phosphorescent body, which maintains luminescence even in the absence of light. Examples of the phosphorescent body are jewelry, sulfides, sulfides of alkali earth metals, zinc sulfides containing heavy metals, aluminates with rare earth elements added, etc. The phosphorescent body is usually used for luminous marks (e.g., marks for switches, plug sockets, products for use in a dark room, parapets and wall marks), photoluminescent marks (e.g., marks for exits, emergency exit doors, fire hydrants and fire alarms) and ornaments (e.g., for ash trays, lighters, necklaces and tiles).

SUMMARY OF THE INVENTION

The object of the present invention is to provide noctilucent polyurethane chips and a method of manufacturing the same, which enable the energy accumulated during the daytime to radiate and emit light in dark place, thus providing pedestrians, drivers or bicycle riders with clear sights even at night or while raining, thereby significantly reducing the danger of accidents.

Another object of the present invention is to provide noctilucent polyurethane chips and their manufacturing method by using waste polyurethane obtained from soles of shoes, parts of refrigerators and vehicles, etc. and decrepit (recycled) polyurethane resilient pavement, thus nursing resources and preventing environmental pollution.

A further object of the present invention is to provide noctilucent polyurethane chips having aesthetic view and excellent functionality, by using phosphorescent substances as a raw material of pavement.

In order to achieve the above objects, the method of manufacturing noctilucent polyurethane chips comprises the steps of:

preparing waste polyurethane scraps by collecting coarse waste polyurethane scraps from soles of shoes, parts of refrigerators and vehicles, decrepit polyurethane resilient pavement, etc. (hereinafter referred to as "waste polyurethane scraps"), separating the scraps according to their colors and removing impurities stuck to the scraps;

pulverizing the prepared waste polyurethane scraps in a predetermined size;

based on 100 kg of the pulverized waste polyurethane scraps, adding 2–5 kg of stearic acid as a melting agent, 1–10 kg of a photoluminescent pigment, 1–3 kg of a flame retardant, 0.1–1 kg of titanium dioxide as a decolorant, and 10–30 kg of heavy calcium carbonate as a brightness adjusting agent, and mixing them by stirring and then extruding through an extruder; and cutting the extruded polyurethane in particle diameter of 3–10 mm.

The noctilucent waste polyurethane chips according to the present invention are those obtained through the above manufacturing steps.

A method of constructing noctilucent resilient pavement by using the noctilucent polyurethane chips obtained by the above manufacturing method comprises the steps of:

removing moisture or impurities on a surface to be paved;

applying a primer layer uniformly on the surface to be paved to secure firm binding between the surface to be paved and the noctilucent polyurethane chips;

blending the noctilucent polyurethane chips with a polyurethane binder by eight ratio of 100:20–40 and applying the blended mixture of the noctilucent polyurethane chips on the surface to be paved uniformly;

pressing the applied mixture of the polyurethane chips for 2 to 4 times with a roller of 20–30 kg and trowelling corners and edges of the applied mixture; and hardening the pressed mixture of the polyurethane chips.

As for the photoluminescent pigment, zinc sulfide compounds are used. The pigment emits light at night by using the energy that has been accumulated during the daytime, and thus it lasts semi-permanently. This is why the photoluminescent pigment can be used in the present invention as an essential component of the noctilucent recycled waste-polyurethane chips.

Further, the roller is used in the step of pressing the layer of the waste polyurethane chips in order to secure firm binding between the waste polyurethane chips and the polyurethane binder. It is preferable that the roller is used in the temperature of 50–100° C., the temperature in which the recycled waste-polyurethane chips and the binder do not stick to the roller.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention, wherein.

DETAILED DESCRIPTION OF THE PREFERRED EMBODIMENTS

Figure 1:
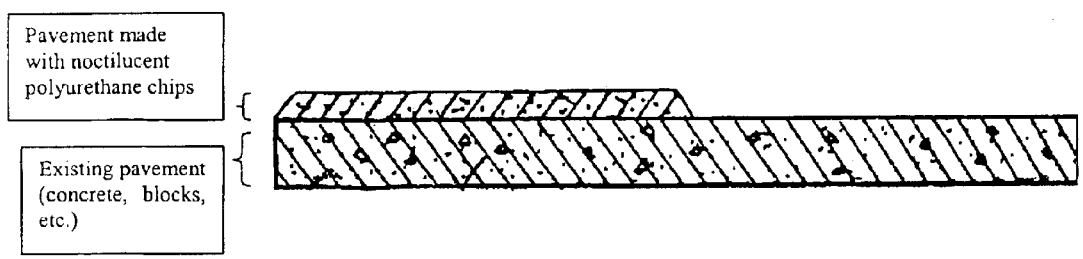
FIG. 1 is a sectional view showing the state where noctilucent polyurethane hips according to the present invention are applied on an existing pavement.
Figure 2:
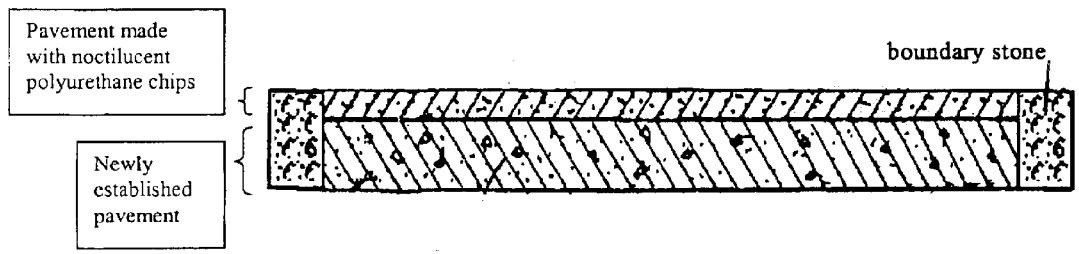
FIG. 2 is a sectional view showing the state where noctilucent polyurethane hips according to the present invention are applied on a newly established pavement.

Reference will now be made in detail to preferred embodiments of the present invention in conjunction with the accompanying drawings.

The principal of the present invention will be described in more detail below with reference to the embodiments, but the scope of the invention is not limited within the embodiments.

[Embodiment 1]

As a preliminary step, waste polyurethane scraps were collected from soles of shoes, parts of refrigerators and vehicles, decrepit polyurethane resilient pavement, etc., and separated according to their colors. From the separated waste polyurethane scraps, impurities stuck thereto were removed by cutting.

Then, the waste polyurethane scraps were pulverized in a crusher in the particle diameter of 3–30 mm, and transported to a mixer.

Based on 100 kg of the pulverized waste polyurethane scraps, 4 kg of stearic acid, 8 kg of a photoluminescent pigment (zinc sulfide), 2 kg of a flame retardant, 0.5 kg of titanium dioxide and 25 kg of heavy calcium carbonate were added and mixed by stirring.

Then, the mixed waste polyurethane scraps were transported through a conveyor to an extruder where they were extruded.

Then, the extruded waste polyurethane was passed to a second crusher and a utter, where it was cut in particle diameter of 3–10 mm, resulting in production of noctilucent polyurethane chips.

[Embodiment 2]

In order to construct noctilucent resilient pavement by using the noctilucent polyurethane chips obtained in the first embodiment, moisture or impurities on a surface to be paved were cleared.

Then, a primer layer was uniformly applied on the surface to be paved to secure a firm binding between the surface to be paved and the noctilucent polyurethane chips. Materials for the primer layer are known in the art.

Then, the noctilucent polyurethane chips obtained in the first embodiment were blended with a polyurethane binder in the ratio of 30% by weight and the blended mixture of the noctilucent polyurethane chips was applied uniformly on the surface to be paved and cleared.

The applied mixture of the noctilucent polyurethane chips were pressed by a roller at about 90° C. for three times so that the noctilucent polyurethane chips and the polyurethane binder can be secured firm. The corners of the applied mixture as a layer or some parts of the layer to which the roller could not extend were simply treated with a heated trowel.

Finally, the layer of the noctilucent polyurethane chips was hardened for 5 to 15 hours. For crowded streets where passing cannot be suspended for a long time, a quick hardening agent was used.

As a result, a noctilucent pavement, which can be seen lucid and clear to pedestrians and drivers or bicycle riders at night and while raining, could be obtained.

The noctilucence of the pavement using the noctilucent polyurethane chips id not become extinct or decreased after several months.

As described above, noctilucent polyurethane chips and a method of manufacturing the same according to the present invention provide pedestrians, drivers or bicycle riders with clear sights even at night or while raining, thus significantly reducing the danger of accidents.

Also, the noctilucent polyurethane chips and the manufacturing method thereof according to the present invention serve to care for natural resources and prevent environmental pollution by recycling waste polyurethane.

In addition, according to the present invention, by using phosphorescent substances as a raw material of pavement, the noctilucent polyurethane chips having aesthetic view and excellent functionality are provided.

It will be apparent to those skilled in the art that various modifications and variations can be made to the present invention without departing from the spirit and scope of the invention. The present invention covers the modifications and variations thereof provided they come within the scope of the appended claims and their equivalents.

What is claimed is:

1. Noctilucent polyurethane chips prepared by the process comprising:
    collecting waste polyurethane scraps and separating the scraps according to their colors;
    pulverizing the waste polyurethane scraps in a predetermined size;
    mixing 2–5 kg of stearic acid, 1–10 kg of a photoluminescent pigment, 1–3 kg of a flame retardant, 0.1–1 kg of titanium dioxide and 10–30 kg of heavy calcium carbonate based on 100 kg of the pulverized waste polyurethane scraps;
    extruding the mixture through an extruder; and
    cutting the extruded polyurethane in particle diameter of 3–10 mm.

2. Noctilucent polyurethane chips according to claim 1 wherein the waste polyurethane scraps are selected from soles of shoes, refrigerator parts, vehicle parts, and decrepit polyurethane resilient pavement.

3. Noctilucent polyurethane chips according to claim 1, wherein the mixing comprises stirring.

4. A method of manufacturing noctilucent polyurethane chips comprising the steps of:
    obtaining a quantity of coarse waste polyurethane scraps, separating the scraps according to their colors and removing impurities stuck to the scraps;
    pulverizing the prepared waste polyurethane scraps in a predetermined size;
    based on 100 kg of the pulverized waste polyurethane scraps, adding 2–5 kg of stearic acid, 1–10 kg of a photoluminescent pigment, 1–3 kg of a flame retardant, 0.1–1 kg of titanium dioxide and 10–30 kg of heavy calcium carbonate, and mixing by stirring and then extruding through an extruder; and
    cutting the extruded polyurethane in particle diameter of 3–10 mm.

5. A method of manufacturing noctilucent polyurethane chips according to claim 3, wherein the waste polyurethane scraps are selected from soles of shoes, refrigerator parts, vehicle parts, and decrepit polyurethane resilient pavement.

* * * * *